United States Patent
Wang et al.

(10) Patent No.: US 11,739,202 B2
(45) Date of Patent: Aug. 29, 2023

(54) BIMODAL POLYPROPYLENE RANDOM COPOLYMER WITH IMPROVED GAMMA-IRRADIATION RESISTANCE

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/040,698

(22) PCT Filed: Apr. 9, 2019

(86) PCT No.: PCT/EP2019/058913
§ 371 (c)(1),
(2) Date: Sep. 23, 2020

(87) PCT Pub. No.: WO2019/197383
PCT Pub. Date: Oct. 17, 2019

(65) Prior Publication Data
US 2021/0054181 A1    Feb. 25, 2021

(30) Foreign Application Priority Data

Apr. 10, 2018   (EP) .................................... 18166468

(51) Int. Cl.
*C08L 23/14*   (2006.01)

(52) U.S. Cl.
CPC ....... *C08L 23/142* (2013.01); *C08L 2205/025* (2013.01); *C08L 2205/24* (2013.01)

(58) Field of Classification Search
CPC ...................... C08L 2205/025; C08L 2205/24
See application file for complete search history.

(56) References Cited

U.S. PATENT DOCUMENTS

| | | | |
|---|---|---|---|
| 4,888,369 A | 12/1989 | Moore, Jr. | |
| 2007/0078203 A1 | 4/2007 | Gohill | |
| 2009/0306271 A1* | 12/2009 | Ommundsen | C08J 5/18 264/572 |
| 2010/0004378 A1* | 1/2010 | Ommundsen | B29C 41/003 525/240 |
| 2014/0220326 A1* | 8/2014 | Resconi | B32B 27/32 428/336 |

FOREIGN PATENT DOCUMENTS

| | | |
|---|---|---|
| CN | 1099400 A | 3/1995 |
| CN | 101313026 A | 11/2008 |
| CN | 101490165 A | 7/2009 |
| CN | 102186671 A | 9/2011 |
| CN | 106795305 A | 5/2017 |
| CN | 107787347 A | 3/2018 |
| EP | 0171704 A1 | 7/1985 |
| EP | 0491566 B2 | 10/1996 |
| EP | 0586390 B1 | 5/1997 |
| EP | 0801104 A1 | 10/1997 |
| EP | 0591224 B1 | 2/1998 |
| EP | 0887379 B1 | 12/2004 |
| EP | 2487199 A1 | 8/2012 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2010/078479 A1 | 7/2010 |
| WO | 2013007650 A1 | 1/2013 |
| WO | 2014191506 A1 | 12/2014 |

OTHER PUBLICATIONS

India Patent Application No. 202017045918; India Examination Report dated Jun. 1, 2021; 4 pgs.
Applicant: Borealis AG; "Bimodal Polypropylene Random Copolymer with Improved Gamma-Irradiation Resistance"; Chinese Application No. 201980021275.4; Chinese Office Action dated Jul. 29, 2022; 18 pgs.

* cited by examiner

Primary Examiner — Wenwen Cai
(74) Attorney, Agent, or Firm — Tarolli, Sundheim, Covell & Tummino L.L.P.

(57) ABSTRACT

The present invention relates to bimodal polypropylene random copolymers comprising ethylene as comonomer and articles made thereof, having an improved resistance against γ-irradiation and are especially suitable for application in the medical, pharmaceutical or diagnostic field.

7 Claims, No Drawings

US 11,739,202 B2

BIMODAL POLYPROPYLENE RANDOM COPOLYMER WITH IMPROVED GAMMA-IRRADIATION RESISTANCE

The present invention relates to bimodal polypropylene random copolymers comprising ethylene as comonomer and articles made thereof.

The bimodal polypropylene random copolymer of the present invention and the according articles are characterised by an improved resistance against γ-irradiation and hence especially suitable for application in the medical, pharmaceutical or diagnostic field.

BACKGROUND INFORMATION

Polypropylene can be produced based on two major groups of polymerization technologies, namely based on Ziegler-Natta catalysis or metallocene based catalysis.

Each of these technologies produces polymers, especially polypropylene grades with specific characteristics:

Polypropylene grades produced with metallocene based catalysts are known for a rather narrow molecular weight distribution and high randomness of comonomer insertion. Ziegler-Natta based polypropylene are known for a broader molecular weight distribution, and a better processability in subsequent conversion steps.

Said highly random comonomer insertion of metallocene based polypropylene however can cause disadvantages for mechanical properties of the final polymer: based on this highly random comonomer distribution, the metallocene based polypropylene grades tend to become much softer than Ziegler-Natta grades at a similar comonomer content, nevertheless providing lower impact behaviour. On the other hand side it is known and accepted that a high randomness of the comonomer incorporation may be helpful to provide polymers with a good γ-irradiation resistance.

Ziegler-Natta catalysts however are more prone to insert the comonomers less randomly, resulting in polymers with longer sequences of the same monomer in a row, but provide polymers with more balanced mechanical properties.

Polypropylene (PP) is one of the most used plastics for packaging applications. In a continuously increasing part of this market, the material is sterilized by either heat (steam), radiation (β/electrons or γ) or chemicals (mostly ethylene oxide), which affects the mechanical and optical properties.

Among all these, the sterilization via γ-radiation is the most relevant method for sterilizing pharmaceutical, medical or diagnostic items.

It is well known, that radiation, mostly the effect of γ-rays, induce chain scission and degradation effects, resulting in a reduced melt viscosity and severe embrittlement. What makes this radical reaction so critical is the fact that it continues for long times after the actual sterilization process, making long-term studies necessary for studying the effects.

DESCRIPTION OF THE PRIOR ART

Various strategies have been published for a reduction of these effects:

Some focus on the use of "mobilizing agents" (paraffinic oils) and special stabilizer formulations. Others combine the polypropylene with specific polyethylene qualities or other polymers:

U.S. Pat. No. 4,888,369 discloses a high energy radiation resistant polypropylene composition. It consists essentially of substantially crystalline normally solid polypropylene having a narrow molecular weight distribution, and, dispersed therein at a concentration effective to increase substantially the high energy radiation resistance of the polypropylene, a synergistic mixture of: (1) a hindered amine component, (2) a hindered phenolic component, and (3) a phosphorous containing component, the weight ratios of component (1) to component (2) to component (3) being about 1:(0.1-2):(0.1-2). Also disclosed are radiation sterilized articles in which at least part of the material of construction comprises the polypropylene composition.

EP0801104 discloses the use of an amorphous polypropylene consisting of a homopolymer of propylene or a copolymer of propylene with one or more alpha-olefins with a propylene content of at least 80 mol.-%, having a melt enthalpy of at most 40 J/g and a melt flow index MI2 of 0.1-100 g/10 min, as additive to improve the stability to ionizing radiation. The addition of amorphous material leads to high migration levels due to oligomers present in the amorphous material.

Sterilization effects on polypropylene (Markus Gahleitner, et.al. Proc. 9th European PLACE Conference (2003) Rome), describes changes in mechanical properties of various polypropylene homopolymers and random copolymers after irradiation at 50 kGy. These results give an indication of the mechanical properties for short periods after sterilization. However, these results do not give any indication on the long term behaviour of irradiated polymer samples.

Maximum Rate of Crystallization and Morphology of Random Propylene Ethylene Copolymers as a Function of Comonomer Content up to 21 mol % (K. Jeon et al., Macromolecules 2008, 41, 95-108) describes propylene ethylene copolymers synthesized with metallocene catalysts in a range of ethylene up to 21 mol %. A $^{13}$NMR triad distribution analysis lends support for a random distribution of the comonomer in the complete series. The polymers disclosed have a molecular weight distribution between 1.71 and 2.12. Propylene number average sequence lengths are given for polymers having a comonomer content of 4.6 mol % or higher.

The article is not concerned with bimodal random copolymers, and does not disclose any information on comonomer distribution or randomness, in the sense of Koenig-B.

EP17171704 discloses unimodal propylene random copolymers with 2.0-4.5 wt.-% of ethylene as comonomer, having improved resistance against γ-irradiation.

It discloses polymers with a specific comonomer distribution determined via a-TREF, produced with a Ziegler Natta catalyst.

There is a constant need within the Health Care industry to have polymers at hand, which can be used for medical articles, withstand higher dosages of irradiation, provide good mechanical properties in the sense of good flexural and impact behaviour. Furthermore, they are supposed to retain the mechanical properties, especially impact behaviour at a higher level and for a longer time after irradiation had taken place.

So the present inventors have sought new propylene-random copolymers, developed in particular for the health care and medical market, which have good mechanical properties in the sense of good flexural and impact behaviour as well as improved resistance against γ-irradiation. This improvement should not be at the expense of any other properties of the polymer or any article formed. Thus, other mechanical properties, e.g. stiffness or low levels of fractions soluble in cold xylene (XCS), should be maintained.

OBJECT OF THE INVENTION

It has been an objective for the present invention to provide a bimodal polypropylene random copolymer showing good mechanical properties in the sense of good flexural and impact behaviour as well as improved long term retention of mechanical properties after irradiation, especially improved long term retention of impact strength after irradiation.

The present inventors have sought for possibilities to modify the polymer structure of propylene-ethylene random copolymers in such a way, that the polymers provide good mechanical properties in the sense of good flexural and impact behaviour and improved long term retention of impact strength after irradiation.

Surprisingly the present inventors have identified a bimodal polypropylene random copolymer of propylene and 2.5-7.0 wt.-% of ethylene as comonomer comprising 24.95-70.0 wt.-% of a first polypropylene fraction being a propylene homopolymer or a random copolymer of propylene and ethylene as comonomer comprising up to 2.0 wt.-% of comonomer, and 29.95-75.0 wt.-% of a second polypropylene fraction being a random copolymer of propylene and ethylene as comonomer comprising 3.0-10.0 wt.-% of comonomer, and 0.05-0.5 wt.-% of a soluble nucleating agent.

In a preferred embodiment, the bimodal polypropylene random copolymer relates to a bimodal polypropylene random copolymer of propylene and 2.5-5.0 wt.-% of ethylene as comonomer comprising 29.95-60.0 wt.-% of a first polypropylene fraction being a random copolymer of propylene and ethylene as comonomer, said random copolymer comprising 0.5-2.0 wt.-% of comonomer, and 39.95-70.0 wt.-% of a second polypropylene fraction being a random copolymer of propylene and ethylene as comonomer, comprising 3.0-7.5 wt.-% of comonomer and 0.05-0.5 wt.-% of a soluble nucleating agent, optionally comprising 1.0-6.0 wt.-% of a fraction soluble in cold xylene (XCS)

In an alternatively preferred embodiment the invention relates to a bimodal polypropylene random copolymer of propylene and 3.0-7.0 wt.-% of ethylene as comonomer, comprising 24.95-55.0 wt.-% of a first polypropylene fraction being a propylene homopolymer, 44.95-75.0 wt.-% of a second polypropylene fraction being a random copolymer of propylene and ethylene as comonomer, comprising 4.0-10.0 wt.-% of comonomer and 0.05-0.5 wt.-% of a soluble nucleating agent and optionally comprising 5.0-15.0 wt.-% of a fraction soluble in cold xylene (XCS).

In still a further alternative embodiment the invention relates to moulded articles comprising the bimodal polypropylene random copolymer and using them in applications intended for gamma-irradiation.

In still a further alternative embodiment the invention relates to the use of the bimodal polypropylene random copolymer for producing articles such as medical, pharmaceutical or diagnostic article or any such articles produced for gamma-irradiation applications.

In still a further alternative embodiment the invention relates to the use of soluble nucleating agents to improve the irradiation resistance or polypropylene copolymers.

DETAILED DESCRIPTION

Bimodal Polypropylene Random Copolymer

The present invention discloses a bimodal polypropylene random copolymer.

The term "random copolymer" has to be preferably understood according to IUPAC (Pure Appl. Chem., Vol. No. 68, 8, pp. 1591 to 1595, 1996).

Accordingly it is preferred that the propylene copolymer does not contain elastomeric (co)polymers forming inclusions as a second phase for improving mechanical properties. A polymer containing elastomeric (co)polymers as insertions of a second phase would by contrast be called heterophasic and is preferably not part of the present invention. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene copolymer (R-PP) according to this invention has no glass transition temperature below −30° C., preferably below −25° C., more preferably below −20° C.

The bimodal polypropylene random copolymer of the present invention may have a melt flow rate $MFR_2$ (230° C.) measured according to ISO 1133 of in the range of 1.0-70.0 g/10 min, preferably in the range of 10.0 to 65.0 g/10 min, like the range of 20.0 to 60.0 g/10 min.

The bimodal polypropylene random copolymer of the present invention comprises 2.5-7.0 wt.-% ethylene as comonomer. Preferably the comonomer content may be in the range of 3.0-6.5 wt.-%, such as 3.6-6.0 wt.-%.

The bimodal polypropylene random copolymer of the present invention comprises low amounts of fractions soluble in cold xylene (XCS). The amount of XCS may be in the range of 1.0-15.0 wt.-%, preferably in the range of 1.5-13.0 wt.-%, like 2.0-11.0 wt.-%.

The bimodal polypropylene random copolymer may have an average molecular weight (Mw) of 100-500 kg/mol, preferably in the range of 120-400 kg/mol, more preferably in the range of 140-350 kg/mol.

The bimodal polypropylene random copolymer may further have a molecular weight distribution (Mw/Mn) of in the range of 2.0 to 4.0, like in the range of 2.4 to 3.6.

The bimodal polypropylene random copolymer of the present invention may have at least two distinct melting temperatures, namely a first melting temperature (Tm1) and a second melting temperature (Tm2).

The first melting temperature (Tm1) may be at least 135° C. or higher, preferably in the range of 135-160° C., more preferably in the range of 145-155° C.

The second melting temperature by be at most 145° C. or below, preferably in the range of 105-140° C., more preferably in the range of 110-137° C.

It is understood that first melting temperature Tm1 indicates the higher melting temperature, whereas the second melting temperature Tm2 indicates the lower melting temperature.

The bimodal polypropylene random copolymer of the present invention may further be characterised by specific melt enthalpies (Hm) of the two melting peaks.

It is understood that the melt enthalpy of the first melting peak (Hm1) is associated with the higher melting temperature (Tm1), whereas the melt enthalpy of the second melting peak (Hm2) is associated with the lower melting temperature (Tm2).

In particular, the bimodal polypropylene random copolymer may be characterised by specific values for the melt enthalpies and especially by a specific ratio of the melt enthalpies of the two melting peaks.

Preferably, the bimodal polypropylene random copolymer of the present invention has a melt enthalpy Hm1 of at most 80 J/g, preferably in the range of 10.0-60.0 J/g, more preferably in the range of 15.0-50.0 J/g.

It is equally preferred, that the melt enthalpy Hm2 of the bimodal polypropylene random copolymer may be at least 30.0 J/g, preferably in the range of 30.0-100, like 33.0-80 J/g.

The ratio of the second to the first melt enthalpy (Hm2/Hm1) may be at least 0.80, preferably in the range of 0.80 to 5.0, more preferably in the range of 0.90 to 4.0, like even more preferably in the range of 0.80 to 2.0 or in the range of 2.0 to 4.0.

Preferably, the nucleated bimodal polypropylene random copolymer of the present invention has a Hm2 of at least 34.0 J/g and a ratio of Hm2/Hm1 of at least 0.80 or more.

Preferably, the propylene copolymer according to this invention has been produced in the presence of a metallocene catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes. These regio-defects can be of three different types, namely 2,1-erythro (2,1 e), 2,1-threo (2,1 t) and 3,1 defects.

A detailed description of the structure and mechanism of formation of regio-defects in polypropylene can be found in Chemical Reviews 2000, 100(4), pages 1316-1327.

The bimodal polypropylene random copolymer of the present invention can further be characterised by its way of comonomer insertion, especially by the normed amount of < >-triads as determined via NMR.

The bimodal polypropylene random copolymer of the present invention may have a normed amount of <PEP>-triads of at most 66.0% or lower, such as 35.0-65.0%, preferably 38.0-63.0%.

Koenig B

The bimodal polypropylene random copolymer of the present invention may be characterised by a specific randomness of the comonomer insertion, defined by a Koenig B value of at least 0.4 or higher, preferably in the range of 0.50-1.20, like 0.70-0.95, or 0.80-0.90. The person skilled is well aware, that the Koenig B describes the randomness of the comonomer insertion of the polymer as a whole and does not take into consideration any specific comonomer distribution depending on molecular weight or the like, which are usually determined via a-TREF.

The bimodal polypropylene random copolymer of the present invention comprises at least two polypropylene fractions, preferably a first and a second polypropylene fraction, which may differ in view of the viscosity, their comonomer content or both.

It is preferred, that the bimodal polypropylene random copolymer of the present invention is bimodal in view of its comonomer content.

Accordingly it is preferred, that the first polypropylene fraction differs from the second polypropylene fraction in view of its comonomer content. Preferably, the comonomer content of the second polypropylene fraction is higher than the comonomer content of the first polypropylene fraction.

It is further preferred, that the bimodal polypropylene random copolymer comprises, more preferably consists of, two polypropylene fractions and additionally a soluble nucleating agents or any further commonly used additive, such as antioxidants, acid scavengers, UV-stabilisers or lubricants up to 5 wt.-%. Preferably the additive content (without soluble nucleating agents) is below 3.0 wt.-%, like below 1.0 wt.-%.

The bimodal polypropylene random copolymer comprises
a) 24.95-70.0 wt.-% of a first polypropylene fraction being a propylene homopolymer or a random copolymer of propylene and ethylene as comonomer, comprising up to 2.0 wt.-% of comonomer and
b) 29.95-75.0 wt.-% of a second polypropylene fraction being a random copolymer of propylene and ethylene as comonomer, comprising 3.0-10.0 wt.-% of comonomer
c) 0.05-0.5 wt.-% of a soluble nucleating agent.

P1 (Embodiment 1)

In a particular preferred first embodiment, the bimodal polypropylene random copolymer comprises
a) 29.95-60.0 wt.-%, preferably 39.95-55.0 wt.-% of a first polypropylene fraction being a random copolymer of propylene and ethylene as comonomer, said random copolymer comprising 0.5-2.0 wt.-% of comonomer and
b) 39.95-70.0 wt.-%, preferably 44.95-60.0 wt.-% of a second polypropylene fraction being a random copolymer of propylene and ethylene as comonomer, comprising 3.0-7.5 wt.-% of comonomer,
c) 0.05-0.5 wt.-% of a soluble nucleating agent,
and has a total comonomer content of 2.5-5.0 wt.-%, preferably 3.0-4.5 wt.-% and optionally 1.0-6.0 wt.-%, like 1.5-5.5 wt.-% of a fraction soluble in cold xylene (XCS).

P2 (Embodiment 2)

In one alternatively preferred second embodiment the bimodal polypropylene random copolymer comprises
a) 24.95-55.0 wt.-%, preferably 29.95-45.0 wt.-% of a first polypropylene fraction being a propylene homopolymer,
b) 44.95-75.0 wt.-%, preferably 54.95-70.0 wt.-% of a second polypropylene fraction being a random copolymer of propylene and ethylene as comonomer, comprising 4.0-10.0 wt.-% of comonomer,
c) 0.05-0.5 wt.-% of a soluble nucleating agent,
wherein the bimodal polypropylene random copolymer is characterised by a total comonomer content of 3.0-7.0 wt.-%, preferably 3.6-6.5 wt.-% and optionally by 5.0-15.0 wt.-%, such as 5.5-13.0 wt.-% of a fraction soluble in cold xylene (XCS).

First Polypropylene Fraction

The bimodal polypropylene random copolymer comprises:
a) 24.95-70.0 wt.-% of a first polypropylene fraction being a propylene homopolymer or a random copolymer of propylene and ethylene as comonomer, comprising up to 2.0 wt.-% of comonomer
b) 29.95-75.0 wt.-% of a second polypropylene fraction being a random copolymer of propylene and ethylene as comonomer, comprising 3.0-10.0 wt.-% of comonomer and
c) 0.05-0.5 wt.-% of a soluble nucleating agent.

The melt flow rate (MFR 230/2.16) according to ISO 1133 of the first polypropylene fraction may be in the range of 1.0-70.0 g/10 min, preferably in the range of 10.0 to 65.0 g/10 min, like the range of 20.0-60.0 g/10 min.

The first polypropylene fraction may be a random copolymer of propylene and ethylene or a propylene homopolymer.

The comonomer content of the first polypropylene fraction differs from the second polypropylene fraction. The first polypropylene fraction may comprise less comonomer than the second polypropylene fraction or none at all.

The comonomer content of the first polypropylene fraction may be in the range of 0.0-2.0 wt.-%, preferably in the range of 0.8-1.8 wt.-%, such as 1.0-1.6 wt.-%.

In an equally preferred embodiment the comonomer content of the first polypropylene fraction is 0.0 wt.-%.

The first polypropylene fraction of the bimodal polypropylene random copolymer may have an average molecular weight (Mw) of 100-600 kg/mol, preferably in the range of 120-400 kg/mol, more preferably in the range of 135-350 kg/mol.

The first polypropylene fraction of the bimodal polypropylene random copolymer may further have a molecular weight distribution (Mw/Mn) of in the range of 2.0 to 4.0, like in the range of 2.4 to 3.6.

Preferably the weight ratio between first polypropylene fraction and the second polypropylene fraction is 20/80 to 80/20, more preferably 30/70 to 70/30, like 35/65 to 65/35 or 45/55 to 55/45.

Second Polymer Fraction

The second polypropylene fraction may have a melt flow rate (MFR 230/2.16) in a similar range as the first polypropylene fraction. Hence it may be in the range of 1.0-70.0 g/10 min, preferably in the range of 10.0 to 65.0 g/10 min, like the range of 20.0-60.0 g/10 min. The melt flow rate (MFR 230/2.16) of the second polypropylene fraction may also differ from the melt flow rate (MFR 230/2.16) of the first polypropylene fraction.

The second polypropylene fraction of the bimodal polypropylene random copolymer may have an average molecular weight (Mw) of 100-600 kg/mol, preferably in the range of 120-400 kg/mol, more preferably in the range of 135-350 kg/mol.

The second polypropylene fraction of the bimodal polypropylene random copolymer may further have a molecular weight distribution (Mw/Mn) of in the range of 2.0 to 4.0, like in the range of 2.4 to 3.6.

The second polypropylene fraction is characterised by a higher comonomer content that the first polypropylene fraction. Preferably, the comonomer content of the second polypropylene fraction may be in the range of 3.0-10.0 wt.-%, like preferably 3.5-9.0 wt.-%.

Furthermore it is preferred, that the comonomer content of the second polypropylene fraction, Co(2), and the comonomer content of the final bimodal polypropylene random copolymer, Co(tot), fulfil together the inequation (I a), preferably (I b), more preferably (I c). Co(2) is the comonomer content [wt.-%] of the second polypropylene fraction, Co(tot) is the comonomer content [wt.-%] of the second polypropylene fraction.

$$1.0 \leq \frac{Co(2)}{Co(tot)} \leq 4.0 \quad \text{(Ia)}$$

$$1.2 \leq \frac{Co(2)}{Co(tot)} \leq 3.0 \quad \text{(Ib)}$$

$$1.3 \leq \frac{Co(2)}{Co(tot)} \leq 2.5 \quad \text{(Ic)}$$

Nucleating Agent

The bimodal polypropylene random copolymer comprises 0.05-0.50 wt.-% of a soluble nucleating agent. Preferably, the soluble nucleating is present in ranges of 0.10-0.45 wt.-%, such as 0.15-0.25 wt.-% or 0.20-0.40 wt.-%.

Soluble nucleating or clarifying agents comprise substances listed below:

e.g. di(alkylbenzylidene)sorbitols as 1,3:2,4-dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl) methylene] nonitol, and benzene-trisamides like substituted 1,3,5-benzenetrisamides as N,N',N''-tris-tert-butyl-1,3,5-benzenetricarboxamide, N,N',N''-tris-cyclohexyl-1,3,5-benzene-tricarboxamide and N-[3,5-bis-(2,2-dimethyl-propionylamino)-phenyl]-2,2-dimethyl-propionamide.

1,3:2,4-di(4-methylbenzylidene) sorbitol, 1,3:2,4-Bis(3,4-dimethylbenzylidene) sorbitol and N-[3,5-bis-(2,2-dimethyl-propionylamino)-phenyl]-2,2-dimethyl-propionamide are equally preferred.

Sorbitol based nucleating agents and nonitol based nucleating agents are particularly preferred.

Physical Properties of the Polymer

Flexural Modulus

The bimodal polypropylene random copolymer of the present invention may have a Flexural Modulus determined according to ISO 178 of at least 900 MPa, such as in the range of 900-2000 MPa.

Preferably, the Flexural Modulus may be in the range of 940 MPa to 1800 MPa, like 980 MPa to 1500 MPa, or from 1050 to 1300 MPa.

Notched Impact Strength (NIS)

The Notched impact strength (NIS) is determined according to ISO179/1eA+23° C. and may be at least 3.0 kJ/m². It may be in the range of 3.0 to 15.0 kJ/m², such as in the range of 3.6 to 10.0 kJ/m², like in the range of 4.0 to 7.0 kJ/m².

Haze

The bimodal polypropylene random copolymer of the present invention is characterised by a low Haze on 1 mm injection moulded plaques according to ASTM D1003. Said Haze values determined on 1 mm injection moulded plaques is denominated as $Haze_1$.

The bimodal polypropylene random copolymer of the present invention may have a $Haze_1$ of at most 20.0%, such as 3.0-20.0%, like 5.0-18.0%, such as 10.0-17.5%.

In a preferred embodiment, the bimodal polypropylene random copolymer of the present invention is characterised by i. a Flexural Modulus of in the range of 900-2000 MPa and ii. a Notched impact strength (NIS) in the range of 3.0 to 15.0 kJ/m² and iii. a $Haze_1$ of at most 20.0%.

Mechanical Properties after Irradiation

The bimodal polypropylene random copolymer of the present invention is characterised by good retention of the mechanical properties, especially a good retention of the impact behaviour after long time after irradiation.

The person skilled is aware, that the radical reaction induced by irradiation continues for long times after the actual sterilization process had taken place and been finished. To simulate and accelerate the long term behaviour after said irradiation had occurred, irradiated samples are exposed to elevated temperatures (i.e. 80° C.). The mechanical properties, especially impact behaviour (Notched Impact Strength, NIS), are tested on said heat aged, irradiated specimen.

Retained Notched Impact Strength after Radiation rNIS$_{(rad;\ days)}$

The bimodal polypropylene random copolymer of the present invention is characterised by a good retention of the impact behaviour, in particular by a good Retained Notched Impact Strength after Radiation rNIS$_{(rad;\ days)}$, wherein "rad" indicates the irradiation dosage in kGy and "days" indicate the consecutive exposure of the irradiated samples in days at 80° C.

Retained Notched Impact Strength (rNIS$_{(rad;\ days)}$,) is determined according to the formula:

$$rNIS_{(rad;days)}[\%] = \frac{\gamma NIS_{(rad;days)} * 100}{NIS_{(0;days)}} \quad (II)$$

wherein:

γNIS$_{(rad;\ days)}$) denominates notched impact strength of an irradiated and heat aged sample, and NIS$_{(0;\ days)}$ denominates the notched impact strength of the same, heat-aged but non-irradiated sample.

Again, "rad" indicates the irradiation dosage in kGy and "days" indicate the consecutive exposure of the irradiated samples in days at 80° C.

Both γNIS$_{(rad;\ days)}$ and NIS$_{(0;\ days)}$) are determined according to Charpy ISO 179/1eA+23° C.

Retained Notched Impact Strength after Radiation rNIS$_{(rad;\ days)}$ is determined by putting into relation the (γNIS$_{(rad;\ days)}$) to the NIS$_{(0;\ days)}$ of the same, heat-aged but non-irradiated material.

The bimodal polypropylene random copolymers of the present invention are characterised by a retained notched impact strength rNIS$_{(50,\ 60)}$ of at least 90.0%, or at 95.0%.

It has been observed that the impact behaviour, namely the notched impact strength (NIS) after irradiation of the present bimodal polypropylene random copolymer has exceeded the values of the neat, untreated samples, resulting in retained NIS values of above 100%. Further worth mentioning is the fact, that the Yellowness index (YI) of all inventive and comparative examples has increased during the irradiation to comparable levels. This is a clear indication, that the polymer did undergo degradation caused by irradiation. The more remarkable is the fact, that the retained impact strength of the bimodal polypropylene random copolymer of the present invention improved to values of above 100%.

The bimodal polypropylene random copolymers of the present invention are characterised by a retained notched impact strength rNIS$_{(rad;\ days)}$ of at least 100%, wherein "rad" may be selected from 25 or 50 kGy and "days" may be selected from 3, 14 or 60 days.

Catalyst

The bimodal polypropylene random copolymer according to the invention is preferably obtainable by a single-site catalyst, more preferably being obtainable by a metallocene catalyst.

The metallocene catalyst is preferably according to the following formula (I).

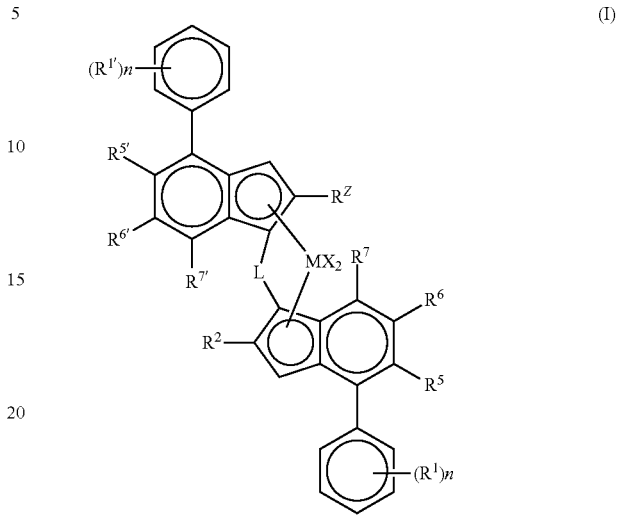

wherein M is Hf or Zr, preferably Zr,

X is a sigma ligand, preferably each X is independently a hydrogen atom, a halogen atom, C1-C6-alkoxy group, C1-C6-alkyl, phenyl or benzyl group, more preferably each X is independently Cl or a methyl group and most preferably each X is either Cl or a methyl group;

L is a bridge of the formula —SiR$^8_2$—, wherein each R$^8$ is independently a C1-C20-hydrocarbyl group, tri(C1-C20-alkyl)silyl, preferably each R$^8$ is independently a C1-C20-linear, branched or cyclic alkyl group, a C6-C20-aryl, C7-C20-arylalkyl or C7-C20-alkylaryl group, more preferably a C1-C20-linear, branched or cyclic alkyl group, even more preferably a linear or branched C1-C20 alkyl group or a C3-C10 cycloalkyl group, even more preferably a linear or branched C1-C6 alkyl group or a C3-C7 cycloalkyl group, e.g. methyl, ethyl, n-propyl, i-propyl, n-butyl or tert.butyl, even more preferably, both R$^8$ are the same and are selected from methyl, ethyl, npropyl, i-propyl, n-butyl or tert.-butyl, even more preferably methyl or ethyl, even more preferably both R$^8$ are methyl;

n is 0, 1 or 2, preferably 1 or 2 and most preferably 1;

R$^1$ and R$^{1'}$ are the same or can be different and can be a linear or branched C1-C6-alkyl group, preferably linear or branched C1 to C4 alkyl group, e.g. methyl, tert.-butyl;

R$^2$ and R$^{2'}$ are the same or can be different and are a CH2-R$^9$ group, with R$^9$ being H or linear or branched C1-C6-alkyl group, more preferably H or linear or branched C1-C3-alkyl, most preferably H;

R$^5$ and R$^{5'}$ are the same or are different and can be H or a linear or branched C1-C6-alkyl group, e.g. methyl, ethyl, n-propyl, i-propyl, n-butyl, i-butyl, sec.-butyl and tert.-butyl, or a OR group, wherein R is a C1-C6-alkyl group.

Preferably R$^5$ and R$^{5'}$ are H or a linear or branched C1-C4-alkyl group or a OR group, wherein R is a C1-C3-alkyl group;

R$^6$ and R$^{6'}$ are the same or are different and can be H or a C(R$^{10}$)3 group, with R$^{10}$ being the same or different and R$^{10}$ can be H or a linear or branched C1-C6-alkyl group, preferably R$^6$ and R$^{6'}$ are H or a C(R$^{10}$)$_3$ group, with R$^{10}$ being the same or different and R$^{10}$ can be a linear or branched C1-C3-alkyl group; or R$^5$ and R$^6$ and/or R$^{5'}$ and R$^{6'}$ taken together form an unsubstituted 4-7 membered ring condensed to the benzene ring of the indenyl moiety, preferably form an unsubstituted 5-6 membered ring condensed to the benzene ring of the indenyl moiety; and
$R^7$ and $R^{7'}$ can be the same or are different and can be H or a linear or branched C1-C6-alkyl group, more preferably H.

The single-site metallocene complex, especially the complexes defined by the formula (I) specified in the present invention, used for manufacture bimodal polypropylene random copolymer are symmetrical or asymmetrical. For asymmetrical complexes that means that the two indenyl ligands forming the metallocene complex are different, that is, each indenyl ligand bears a set of substituents that are either chemically different, or located in different positions with respect to the other indenyl ligand. More precisely, they are chiral, racemic bridged bis-indenyl metallocene complexes. Whilst the complexes of the invention may be in their syn-configuration, ideally they are in their anti-configuration. For the purpose of this invention, racemic-anti means that the two indenyl ligands are oriented in opposite directions with respect to the cyclopentadienyl-metalcyclopentadienyl plane, while racemic-syn means that the two indenyl ligands are oriented in the same direction with respect to the cyclopentadienyl-metal-cyclopentadienyl plane, as shown in the FIGURE below.

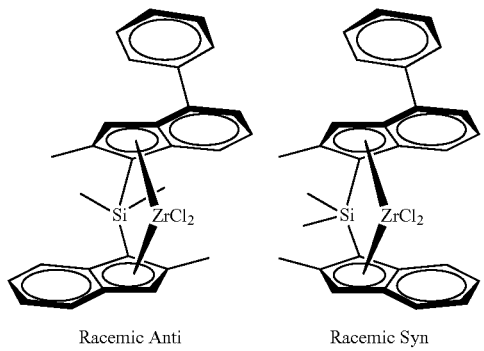

Racemic Anti          Racemic Syn

Formula (I) is intended to cover both, syn- and anti-configurations. By nature of their chemistry, both anti and syn enantiomer pairs are formed during the synthesis of the complexes. However, by using the ligands of this invention, separation of the preferred anti-isomers from the syn-isomers is straightforward.

It is preferred that the metallocene complexes of the invention are employed as the racemic antiisomer. Ideally therefore at least 95% mol, such as at least 98% mol, especially at least 99% mol of the metallocene catalyst is in the racemic anti-isomeric form. In a preferred embodiment at least one of the phenyl groups is substituted with at least one of $R^1$ or $R^{1'}$, thus n can be 0 only for one of the ligands and not for both. If n is 1, then $R^1$ and $R^{1'}$ are preferably on position 4 (para) of the phenyl ring and if n is 2 then $R^1$ and $R^{1'}$ are preferably on positions 3 and 5 of the phenyl ring. Different combinations for $R^1$ and $R^{1'}$ are possible. Preferably both phenyl rings are substituted by $R^1$ and $R^{1'}$, whereby n can be the same or can be different for the two phenyl rings and is 1 or 2.

More preferably in the catalyst according to formula (I) M is Zr,
X is independently a hydrogen atom, a halogen atom, or C1-C6-alkyl, even more preferably each X is independently Cl or a methyl group and most preferably each X is either Cl or a methyl group;

L is a bridge of the formula $-SiR^8{}_2-$, wherein each $R^8$ is independently a linear or branched C1-C20 alkyl group, even more preferably a linear or branched C1-C6 alkyl group, e.g. methyl, ethyl, n-propyl, i-propyl, n-butyl or tert.-butyl, yet even more preferably, both $R^8$ are the same and are selected from methyl, ethyl, n-propyl, i-propyl, n-butyl or tert.-butyl, still more preferably methyl or ethyl, most preferably both $R^8$ are methyl;
n is 1 or 2, most preferably each n is 1;
$R^1$ and $R^{1'}$ are the same or can be different and can be a linear or branched C1 to C4 alkyl group, e.g. methyl, tert.-butyl;
$R^2$ and $R^{2'}$ are the same or can be different and are a CH2-$R^9$ group, with $R^9$ being H or linear or branched C1-C3-alkyl, most preferably H;
$R^5$ and $R^{5'}$ are the same or are different and can be H or a linear or branched C1-C4-alkyl group, e.g. methyl, ethyl, n-propyl, i-propyl, n-butyl, i-butyl, sec.-butyl and tert.-butyl, or a OR group, wherein R is a C1-C3-alkyl group; $R^6$ and $R^{6'}$ are the same or are different and can be H or a C($R^{10}$)$_3$ group, with $R^{10}$ being the same or different and $R^{10}$ can be a linear or branched C1-C3-alkyl group; or $R^5$ and $R^6$ and/or $R^{5'}$ and $R^{6'}$ taken together form an unsubstituted 5-6 membered ring condensed to the benzene ring of the indenyl moiety; and $R^7$ and $R^{7'}$ are H.

In one variant both of $R^5$ and $R^6$ as well as $R^{5'}$ and $R^{6'}$ together form an unsubstituted 4-7, preferably 5-6 membered ring condensed to the benzene ring of the indenyl moiety and, optionally and preferably, $R^2$ and $R^{2'}$ each is a C1 to C4 alkyl group, more preferably methyl group.

More preferably both of $R^5$ and $R^6$ as well as $R^{5'}$ and $R^{6'}$ form an unsubstituted 5 membered ring condensed to the benzene ring of the indenyl moiety and optionally and preferably, $R^2$ and $R^{2'}$ each is a methyl group.

In another variant it is also possible that at both ligands $R^5$ and $R^6$ as well as $R^{5'}$ and $R^{6'}$ are hydrogen.

Still a further possibility is that only one of the ligands is unsubstituted in position 5 and 6. In other words, either $R^5$ and $R^6$ or $R^{5'}$ and $R^{6'}$ are hydrogen.

Polymerization Process

The term "sequential polymerization process" indicates that the bimodal polypropylene random copolymer is produced in at least two reactors, preferably in two reactors, connected in series.

Accordingly the present process comprises at least a first reactor (R1) and a second reactor (R2). The term "polymerization reactor" shall indicate that the main polymerization takes place. Thus, in case the process consists of two polymerization reactors, this definition does not exclude the option that the overall process comprises for instance a pre-polymerization step in a pre-polymerization reactor. The term "consist of" is only a closing formulation in view of the main polymerization reactors. The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) is preferably a gas phase reactor (GPR). Such gas phase reactor (GPR) can be any mechanically mixed or fluid bed reactor. For example the gas phase reactor (GPR) can be a mechanically agitated fluid bed reactor with gas velocities of at least 0.2 m/sec. Thus it is appreciated that the gas phase reactor is a fluidized bed type reactor, optionally with a mechanical stirrer.

Thus in a preferred embodiment the first reactor (R1) is a slurry reactor (SR), like a loop reactor (LR), whereas the second reactor (R2) is a gas phase reactor (GPR). Accordingly for the instant process two polymerization reactors, namely a slurry reactor (SR), like a loop reactor (LR), and a gas phase reactor (GPR) are connected in series. If needed prior to the slurry reactor (SR) a pre-polymerization reactor is placed. Preferably in the first reactor (R1) the first polypropylene fraction of the bimodal polypropylene random copolymer is produced, whereas in the second rector (R2) the second polypropylene fraction is produced.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell described e.g. in FIG. 20 of the paper by Galli and Vecello, Prog.Polym.Sci. 26 (2001) 1287-1336.

Articles

The bimodal polypropylene random copolymer of the present invention is especially suitable for producing moulded article, like injection moulded articles, for various applications, which are intended for sterilization.

The bimodal polypropylene random copolymer of the present invention is especially suitable for articles for medical or diagnostic applications intended for sterilization via gamma-radiation, such as syringes, connectors, pouches, tubes, peripheral venous catheter, butterfly winged infusion sets, protective caps or protective covers, etc.

Such moulded articles may comprise at least 50 wt.-%, like at least 70 wt.-%, more preferably at least 90.0 wt.-%, yet more preferably at least 95.0 wt.-%, still more preferably consisting of the bimodal polypropylene random copolymer of the present invention as defined herein.

Further the present invention is also directed to the use of the bimodal polypropylene random copolymer as defined herein for producing moulded articles, particularly injection moulded articles.

The present invention is also directed to the use of the bimodal polypropylene random copolymer as defined herein for producing medical applications intended for sterilization via gamma-radiation, such as syringes, connectors, pouches, tubes, peripheral venous catheter, butterfly winged infusion sets, protective caps or protective covers, etc.

Use of Nucleating Agents

The present invention encompasses the use of soluble nucleating agents for improving the resistance against γ-irradiation.

Soluble nucleating agents are particularly beneficial to improve the γ-irradiation resistance of propylene polymers, like polypropylene random copolymers, such as bimodal polypropylene random copolymer.

Soluble nucleating agents are particularly beneficial to improve the retained notched impact strength (rNIS) after irradiation.

Soluble nucleating agents can be used to achieve values for retained notched impact strength (rNIS) after irradiation at 25 or 50 kGy of 100% or above.

In particular, soluble nucleating agents can be used to achieve values for retained notched impact strength $rNIS_{(rad; days)}$ of at least 100%, wherein
"rad" may be selected from 25 or 50 kGy and
"days" may be selected from 3, 14 or 60 days.

The present invention will now be described in further detail by the examples provided below:

Examples

Measuring Methods

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

The MFR of the second fraction, produced in the second reactor is determined according to $$\log(MFR(F2)) = \frac{\log(MFR(BPR)) - w(F1) * \log(MFR(F1))}{w(F2)} \quad \text{Eq. (III)}$$

Wherin MFR (BPR) denominates the MFR of the bimodal polypropylene random copolymer, w(F1) and w(F2) denominate the weight fractions of the first polypropylene fraction and second polypropylene fraction respectively MFR(F1) denominates the MFR of the first polypropylene fraction produced in the first reactor.

Xylene Cold Soluble (XCS)

Xylene Cold Soluble fraction at room temperature (XCS, wt.-%) is determined at 25° C. according to ISO 16152; $5^{th}$ edition; 2005 Jul. 1.

Flexural Modulus

The flexural modulus was determined in 3-point-bending at 23° C. according to ISO 178 on 80×10×4 mm³ test bars injection moulded in line with EN ISO 1873-2.

Notched Impact Strength (NIS):

The Charpy notched impact strength (NIS) was measured according to ISO 179 1eA at +23° C., using injection moulded bar test specimens of 80×10×4 mm³ prepared in accordance with EN ISO 1873-2.

$\gamma NIS_{(rad; days)}$ denominates Notched impact strength (NIS) determined after irradiation and heat exposure at 80° C., wherein "rad" denominates the irradiation (50 kGy) and "days" denominates the duration of heat exposure at 80° C. in circulating air of the irradiated sample in days.

Accordingly $NIS_{(0; days)}$ denominates the notched impact strength determined samples that underwent heat exposure at 80° C. for the given days in circulating air without preceding irradiation.

Retained Notched Impact Strength after Radiation $rNIS_{(rad; days)}$ is determined by putting into relation the notched impact strength of an irradiated and heat aged sample ($\gamma NIS_{(rad; days)}$) to the $NIS_{(0; days)}$ of the same, heat-aged but non-irradiated material:

$$rNIS_{(rad;days)}[\%] = \frac{\gamma NIS_{(rad;days)} * 100}{NIS_{(0;days)}} \quad \text{(Equ. II)}$$

Based on the values given below, the retained Impact Strength after Radiation $rNIS_{(50,60)}$ for IE1 after 50 kGy and 60 days would be:

5.3/5.5*100=96.4%

Irradiation

Injection moulded test specimen of 80×10×4 mm³ prepared in accordance with EN ISO 1873-2 were exposed to gamma irradiation at 25 and 50 kGy using a $^{60}$Co γ-ray source. Consecutively the samples were aged at 80° C. in a circulating air oven up to 60 days as indicated below.

Once the desired time was reached, the samples were taken out from the oven and aged at 23° C. for 24 hours before the impact test according to Charpy ISO 179/1eA+ 23° C. was performed.

Yellowness Index (YI)

Yellowness Index was determined according to ASTM E 313.

Haze

Haze determined according to ASTM D1003-00 on 60×60×1 mm$^3$ plaques injection moulded in line with EN ISO 1873-2. Haze$_1$ denominates a haze value determined on 1 mm thick plaques.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_a$) and heat of crystallization ($H_c$) are determined from the cooling step, while melting temperature ($T_m$) and melt enthalpy ($H_m$) are determined from the second heating step.

Throughout the patent the term Tc or (Tcr) is understood as Peak temperature of crystallization as determined by DSC at a cooling rate of 10 K/min.

Description of Quantitative $^{13}$C NMR Spectroscopy

Quantitative nuclear-magnetic resonance (NMR) spectroscopy was used to quantify the comonomer content of the polymers, comonomer dyad sequence distribution and sequence order parameter quantification.

Quantitative $^{13}$C{$^1$H} NMR spectra were recorded in the solution-state using a Bruker Avance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Comonomer Content Quantification of Poly(Propylene-Co-Ethylene) Copolymers

Quantitative $^{13}$C{$^1$H} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fractions calculated as the fraction of ethylene and propylene in the polymer with respect to all monomer in the polymer:

$$fE = E/(P+E)$$

$$fP = P/(P+E)$$

The comonomer fraction was quantified using the method of Wang et. al. (Wang, W-J., Zhu, S., Macromolecules 33 (2000), 1157) through integration of multiple signals across the whole spectral region in the $^{13}$C{$^1$H} spectra. This method was chosen for its robust nature and ability to account for the presence of regio-defects when needed.

The mole percent comonomer incorporation was calculated from the mole fraction:

$$E[\text{mol \%}] = 100 * fE$$

The weight percent comonomer incorporation was calculated from the mole fraction:

$$E[\text{wt.-\%}] = 100 * (fE*28.06)/((fE*28.06) + ((1-fE)*42.08))$$

Comonomer Dyad Sequences Determination

Comonomer sequence distribution was quantified at the dyad level using the characteristic signals corresponding to the incorporation of ethylene into propylene-ethylene copolymers (Cheng, H. N., Macromolecules 17 (1984), 1950). Integrals of respective sites were taken individually, the regions of integration described in the article of Wang et. al. were not applied for dyad sequence quantification.

It should be noted that due to overlapping of the signals of Tβδ and Sγγ, the compensation equations were applied for integration range of these signals using the sites Sβδ and Sγδ:

$$S\gamma\gamma = (I(S\beta\delta) - I(S\gamma\delta))/2$$

$$T\beta\delta = I(T\beta\delta + S\gamma\gamma) - (I(S\beta\delta) - I(S\gamma\delta))/2$$

With characteristic signals corresponding to regio defects observed (Resconi, L., Cavallo, L., Fait, A., Piemontesi, F., Chem. Rev. 2000, 100, 1253; Cheng, H. N., Macromolecules 17 (1984), 1950; Wang, W-J., Zhu, S., Macromolecules 33 (2000), 1157) the correction for the influence of the regio defects on comonomer contents was required.

In case of 2,1-erythro mis-insertions presence the signal from ninth carbon ($S_{21e9}$) of this microstructure element (Resconi, L., Cavallo, L., Fait, A., Piemontesi, F., Chem. Rev. 2000, 100, 1253) was chosen for compensation.

In case of 2,1 regeioirregular propene units in structure with one successive ethylene units presence, the signal from Tγγ (Cheng, H. N., Macromolecules 17 (1984), 1950; Wang, W-J., Zhu, S., Macromolecules 33 (2000), 1157) was chosen for compensation.

The constitutive equations were:

$$EP = 2*T\delta\delta + T\beta\delta + 2*T\gamma\gamma = 2*I(T\delta\delta) + I(T\beta\delta + S\gamma\gamma) - (I(S\beta\delta) - I(S\gamma\delta))/2 + 2*I(T\gamma\gamma)$$

$$EE = S\gamma\gamma + S\gamma\delta + (S\delta\delta - S\gamma\delta/2)/2 = 0.5*I(S\beta\delta) + 0.5*I(S\delta\delta) + 0.25*I(S\gamma\delta)$$

$$PP = T\beta\delta/2 + T\beta\beta + 3*S_{21e9} + 2*T\gamma\gamma = 0.5*(I(T\beta\delta + S\gamma\gamma) - (I(S\beta\delta) - I(S\gamma\delta))/2) + I(T\beta\beta) + 2*I(T\gamma\gamma) + 3*I(S_{21e9})$$

Note that for simplicity the two indistinguishable reversible PE and EP dyads are termed EP i.e. EP=PE+EP. The mole fraction of each dyad was determined through normalisation to the sum of all dyads.

$$XX=PP+EP+EE$$

$$fPP=PP/XX$$

$$fEP=EP/XX$$

$$fEE=EE/XX$$

Sequence Order Parameter Description and Quantification

Sequence order parameter, $\chi$ as it is defined by Koenig (Koenig92: Spectroscopy of Polymers, Lack. L Koenig. American Chemical Society, Washington, D.C. 1992) (or "Koenig B-value" as it is named in WO 2010/078479 A1), yields information about whether the distribution of the structures is random, i.e. can be described by Bernoullian statistics, and whether it tends towards an alternating or block distribution. This parameter can be determined by the formula:

$$B_{Koenig}=fEP/(2*fE*fP) \quad (IV)$$

Material Description:

Catalyst for P1 and P2:

The catalyst for the bimodal polypropylene random copolymer was rac-anti-Me$_2$Si(2-Me-4-(p-tBuPh)-Ind)(2-Me-4-Ph-5-OMe-6-tBu-Ind)ZrCl$_2$ prepared as described in WO2013007650.

Preparation of the Solid Catalyst System

Inside the glovebox, 80 µL of a dry and degassed mixture of perfluoroalkylethyl acrylate ester were mixed in a septum vial with 2 mL of a 30 wt-% solution of MAO in toluene and left to react overnight. The following day, 58.9 mg of the metallocene of the invention rac-anti-Me$_2$Si(2-Me-4-(p-tBuPh)-Ind)(2-Me-4-Ph-5-OMe-6-tBu-Ind)ZrCl$_2$ (0.076 mmol, 1 equivalent) were dissolved with 4 mL of the MAO solution in another septum bottle and left to stir inside the glovebox. After 60 minutes, the 4 mL of the MAO-metallocene solution and 1 mL of the perfluoroalkylethyl acrylate ester mixture in MAO solution were successively added into a 50 mL emulsification glass reactor containing 40 mL of hexadecafluoro-1,3-dimethylcyclohexane kept at −10° C. and equipped with an overhead stirrer (stirring speed=600 rpm). Total amount of MAO is 5 mL (300 equivalents). A red emulsion formed immediately (measured emulsion stability=16 seconds) and was stirred during 15 minutes at 0° C./600 rpm. Then the emulsion was transferred via a 2/4 teflon tube to 100 mL of hot hexadecafluoro-1,3-dimethylcyclohexane heated to 90° C., and stirred at 600 rpm until the transfer is completed. The speed was reduced to 300 rpm. After 15 minutes stirring, the oil bath was removed and the stirrer turned off. The catalyst was left to settle up on top of the hexadecafluoro-1,3-dimethylcyclohexane and after 35 minutes the solvent was siphoned off. The remaining red catalyst was dried during 2 hours at 50° C. over an argon flow. 0.62 g of a red free flowing powder was obtained.

The polymerization of P1 and P2 was performed in a Borstar PP pilot plant unit with liquid phase prepolymerization unit, bulk loop reactor and one gas phase reactors in series. Table 1 summarizes the polymerization data.

TABLE 1

Polymerization Details of the inventive base polymers P1 and P2

|  |  | P1 | P2 | CE1 | CE2 |
|---|---|---|---|---|---|
| Prepoly reactor |  |  |  |  |  |
| Temperature | ° C. | 20.0 | 20.0 |  |  |
| Catalyst feed | g/h | 0.6 | 1.2 |  |  |
| Residence time | h | 0.4 | 0.4 |  |  |
| Loop |  |  |  |  |  |
| Temperature | ° C. | 70.0 | 75.0 |  |  |
| H2/C3 | mol/kmol | 0.5 | 0.5 |  |  |
| C2/C3 | mol/kmol | 25.1 | 0.0 |  |  |
| Polymer Split | wt.-% | 46.4 | 32.7 |  |  |
| MFR2 | g/10 min | 24.9 | 38.1 |  |  |
| C2 Loop (NMR) | wt.-% | 1.3 | 0.0 |  |  |
| XCS Loop | wt.-% | 0.8 | 0.6 |  |  |
| GPR1 |  |  |  |  |  |
| Temperature | ° C. | 80.0 | 80.0 |  |  |
| H2/C3 | mol/kmol | 6.6 | 7.9 |  |  |
| C2/C3 | mol/kmol | 141 | 192 |  |  |
| C2 in GPR1 (Co(2)) | wt.-% | 6.1 | 8.0 |  |  |
| Polymer Split | wt.-% | 53.6 | 67.3 |  |  |
| MFR2 in GPR1 | g/10 min | 34.0 | 27.0 |  |  |
| Final polymer: |  |  |  |  |  |
| MFR2 total | g/10 min | 29.5 | 31.6 | 20 | 44.0 |
| C2 total (NMR) | wt.-% | 3.9 | 5.4 | 3.8 |  |
| Co(2)/Co(total) | % | 1.56 | 1.48 |  |  |
| XCS total | wt.-% | 2.3 | 9.8 | 7.6 | 14.0 |
| Mw | kg/mol | 150 | 145 |  |  |
| Mw/Mn | — | 2.6 | 2.7 |  |  |
| Tg | ° C. | −3 | −4 |  |  |

The person skilled is aware, that the polymer fraction produced in GPR1 is produced in the presence of the preceding polymer fraction produced in the loop and accordingly cannot be analysed as such. Hence, it is clear that the properties C2 in GPR1 and MFR in GPR1 have been calculated based on the available figures for the material coming from the loop reactor and the values as determined on the final polymer.

All the polymers of the inventive examples IE1 to IE4 and were stabilised with 1500 ppm Tinuvin 622, 1000 ppm Irgafos 168 (both supplied by BASF and others), 500 ppm Calcium-stearate.

As regards the soluble nucleating agents:

2000 ppm MDBS (Millad 3940) were used in IE1, 2000 ppm DMDBS (Millad 3988) were used in 1E2 and 1E3, 4000 ppm of NX8000 were used in IE4.

All mentioned nucleating agents are commercially available by Milliken.

Comparative example CE 1 is the commercial grade RF830MO of Borealis AG, Austria, having an MFR of 20 g/10 min, a total ethylene content of 3.4 wt.-% and an XCS content of 7.6 wt.-%. CE1 comprises a 2000 ppm of a soluble nucleating agent.

CE1 was produced in the presence of a Ziegler Natta catalyst system having an internal donor as disclosed in EP491566, EP591224 and EP586390.

For comparative example CE2 the base polymer P2 and has been nucleated by blending it with 5 wt.-% of the commercial grade BC918CF of Borealis AG, Austria and visbroken, resulting in a composition having an MFR of 44.0 g/10 min, an ethylene content of 3.5 wt.-% and an XCS of 10.0 wt.-%.

CE2 further comprised 500 ppm of synthetic hydrotalcite MAHC, 2000 Arenox DL (supplied by Reagens) and 1000 ppm Irgafos 168 (supplied by BASF)

BC918CF is a heterophasic copolymer having an MFR of 3.0 g/10 min, an elastomer content equivalent to an XCS of 14 wt.-% and a total ethylene content of 4.2 wt.-%, comprising 25 ppm of a polymeric nucleating agent.

TABLE 2

NMR-results of the Inventive and Comparative examples

|  |  | P1 IE1/2 | P2 IE3/4 | CE1 |
|---|---|---|---|---|
| C2 total | wt.-% | 5.4 | 3.9 | 3.5 |
| C2 total | Mol-% | 7.9 | 5.6 | 5.2 |
| <PEP> norm. | % | 45.4 | 61.7 | 68.3 |
| <EEE> | Mol-% | 2.9 | 0.5 | 0.6 |
| <EEP> | Mol-% | 1.3 | 1.6 | 1.1 |
| <PEP> | Mol-% | 3.5 | 3.4 | 3.6 |
| <PPP> | Mol-% | 84.1 | 85.3 | 86.8 |
| <EPP> | Mol-% | 7.8 | 8.8 | 7.6 |
| <EPE> | Mol-% | 0.5 | 0.5 | 0.3 |
| Koenig B: |  | 0.88 | 0.57 |  |

TABLE 3

Recipes and basic properties

|  |  | CE1 | CE2 | IE1 | IE2 | IE3 | IE4 |
|---|---|---|---|---|---|---|---|
| P1 | wt.-% |  |  | 99.5 | 99.5 |  |  |
| P2 | wt.-% |  | 94.65 |  |  | 99.5 | 99.3 |
| BC918CF | wt.-% |  | 5 |  |  |  |  |
| MDBS | wt.-% |  |  |  | 0.2 |  |  |
| DMDBS | wt.-% | 0.2 |  | 0.2 |  | 0.2 |  |
| NX8000 | wt.-% |  |  |  |  |  | 0.4 |
| MFR | g/10 min | 20 | 44 | 47 | 46 | 43 | 39 |
| Tc | ° C. | 120 | 120 | 116 | 115 | 125 | 127 |
| Tm1 | ° C. | 154 | 154 | 145 | 146 | 155 | 155 |
| Tm2 | ° C. | 137 | 110 | 134 | 135 | 111 | 110 |
| Hm1 | J/g | 85 | 41 | 17 | 16 | 37 | 45.3 |
| Hm2 | J/g | 2 | 34 | 62 | 57 | 39 | 36.4 |
| Ratio Hm2/Hm1 |  | 0.02 | 0.83 | 3.65 | 3.56 | 1.05 | 0.80 |
| Flexural. mod. | MPa | 1044 | 911 | 1126 | 1145 | 968 | 1009 |
| NIS 23° C. | kJ/m² | 4.8 | 5.6 | 4.4 | 4.4 | 5 | 4.4 |
| Haze 1 mm | % | 17.9 | 43 | 8.4 | 13.4 | 16.6 | 5.4 |

TABLE 4

Physical Properties after Irradiation and/or Heat Aging

| | Irradiation ||||||||| 
|---|---|---|---|---|---|---|---|---|---|
| | 0 kGy ||| 25 kGy ||| 50 kGy |||
| Days | NIS | Flex | YI | NIS | Flex | YI | NIS | Flex | YI |
| | CE1 |||||||||
| 3 | 5.8 | 1079 | −0.1 | 5.2 | 1096 | 0.7 | 4.9 | 1105 | 1.2 |
| 14 | 5.8 | 1093 | 0.3 | 5.2 | 1119 | 1.8 | 4.9 | 1140 | 2.4 |
| 60 | 5.7 | 1113 | −0.1 | 5.4 | 1140 | 1.5 | 4.9 | 1164 | 2.6 |
| | CE2 |||||||||
| 3 | 6.7 | 868 | 0.2 | 5.8 | 897 | 0.3 | 5.9 | 903 | 0.8 |
| 14 | 6.9 | 859 | −0.2 | 6.1 | 887 | 2.2 | 3.7 | 903 | 2.9 |
| 60 | 6.6 | 879 | −0.4 | 4.2 | 913 | 15.9 | 2.9 | 929 | 37.3 |
| | IE1 |||||||||
| 3 | 5.5 | 1095 | 0.6 | 5.7 | 1092 | 0.8 | 5.3 | 1094 | 1.4 |
| 14 | 5.5 | 1102 | 0.8 | 5.7 | 1103 | 1.3 | 5.7 | 1107 | 2.0 |
| 60 | 5.5 | 1119 | 0.5 | 5.5 | 1123 | 1.4 | 5.7 | 1124 | 2.7 |
| | IE2 |||||||||
| 3 | 5.4 | 1106 | 0.3 | 5.0 | 1116 | 0.6 | 5.5 | 1101 | 1.1 |
| 14 | 5.3 | 1116 | 0.7 | 5.4 | 1125 | 1.2 | 5.6 | 1118 | 1.9 |
| 60 | 5.5 | 1132 | 0.4 | 5.3 | 1148 | 1.4 | 5.4 | 1137 | 2.3 |
| | IE3 |||||||||
| 3 | 6.5 | 929 | 0.4 | 7.2 | 924 | 0.6 | 7.1 | 919 | 1.1 |
| 14 | 7.3 | 925 | 0.5 | 7.7 | 928 | 1.0 | 9.4 | 927 | 1.8 |
| 60 | 7.6 | 935 | 0.4 | 8.0 | 939 | 1.4 | 8.3 | 940 | 2.6 |
| | IE4 |||||||||
| 3 | 6.4 | 920 | −0.6 | 6.8 | 911 | 0.4 | 7.3 | 905 | 0.9 |
| 14 | 7.3 | 917 | −0.5 | 7.2 | 916 | 1.1 | 8.1 | 918 | 1.6 |
| 60 | 7.6 | 919 | −1.3 | 7.6 | 931 | 1.6 | 8.6 | 926 | 2.0 |

TABLE 5 retained NIS [%] after irradiation with 25 kGy

| Days: | CE1 | CE2 | IE1 | IE2 | IE3 | IE4 |
|---|---|---|---|---|---|---|
| 3 | 89.3 | 87.2 | 103.6 | 92.5 | 111.1 | 106.6 |
| 14 | 89.8 | 87.8 | 104.4 | 101.5 | 106.2 | 98.6 |
| 60 | 95.8 | 63.4 | 99.1 | 96.9 | 104.6 | 100.1 |

TABLE 6 retained NIS [%] after irradiation with 50 kGy

| Days: | CE1 | CE2 | IE1 | IE2 | IE3 | IE4 |
|---|---|---|---|---|---|---|
| 3 | 84.5 | 88.1 | 96.4 | 101.9 | 109.2 | 114.1 |
| 14 | 84.7 | 53.6 | 103.6 | 105.7 | 128.8 | 111.0 |
| 60 | 85.8 | 43.9 | 103.6 | 98.2 | 109.2 | 113.2 |

The data clearly show, that the bimodal polypropylene random copolymer of the present invention has improved resistance against γ-irradiation. The data further show, that the bimodal polypropylene random copolymer has improved long term retention of mechanical properties after irradiation, especially improved long term retention of impact strength after irradiation.

The objective of the invention is fulfilled.

The invention claimed is:

1. A bimodal polypropylene random copolymer, comprising:
   a) 24.95-55.0 wt. % of a first polypropylene fraction being a propylene homopolymer,
   b) 44.95-75.0 wt. % of a second polypropylene fraction being a random copolymer of propylene and ethylene as comonomer, comprising 4.0-10.0 wt. % of comonomer, and
   c) 0.05-0.5 wt. % of a soluble nucleating agent, the soluble nucleating agent being selected from the group consisting of sorbitol based nucleating agents, nonitol based nucleating agents, and benzene-trisamides,
   wherein the bimodal polypropylene random copolymer comprises a total comonomer content of 3.0-7.0 wt. % and 5.0-15.0 wt. % of a fraction soluble in cold xylene (XCS),
   wherein the bimodal polypropylene random copolymer is polymerized in the presence of a metallocene catalyst,
   wherein the bimodal polypropylene random copolymer has a molecular weight distribution MWD of 2.4 to 3.6,
   wherein the bimodal polypropylene random copolymer has a König B parameter of 0.50 to 1.20, and
   wherein the bimodal polypropylene random copolymer has a first melting temperature (Tm1) in the range of 145 to 155° C. and a second melting temperature (Tm2) in the range of 110 to 137° C.

2. The bimodal polypropylene random copolymer according to claim 1, wherein the bimodal polypropylene random copolymer has a Melt Flow Rate determined according to ISO1133 at 230° C. and 2.16 kg (MFR230/2.16) of 1.0-70.0 g/10 min.

3. The bimodal polypropylene random copolymer according to claim 1, wherein the bimodal polypropylene random copolymer has a Haze of at most 20.0% when measured according to ASTM D1003 on 1 mm injection moulded plaques.

4. The bimodal polypropylene random copolymer according to claim 1, wherein the bimodal polypropylene random copolymer has a retained notched Impact Strength rNIS after irradiation with 50 kGy ($rNIS_{(50;\ days)}$) according a formula $$rNIS_{(50;days)}[\%] = \frac{\gamma NIS_{(50;days)} * 100}{NIS_{(0;days)}}$$

of at least 90.0%, wherein "days" is heat exposure at 80° C. for 60 days.

5. The bimodal polypropylene random copolymer according to claim 1, wherein the soluble nucleating agent is selected from the group consisting of sorbitol based nucleating agents and nonitol based nucleating agents.

6. A moulded article comprising the bimodal polypropylene random copolymer according to claim 1.

7. The moulded article according to claim 6, wherein the moulded article is a medical, pharmaceutical or diagnostic article.

* * * * *